June 23, 1925.
O. A. DANIELSON
BALANCED TRANSMISSION FOR DISTANT INDICATORS
Filed May 18, 1920
1,543,061
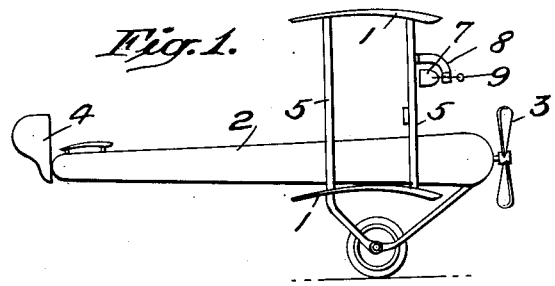
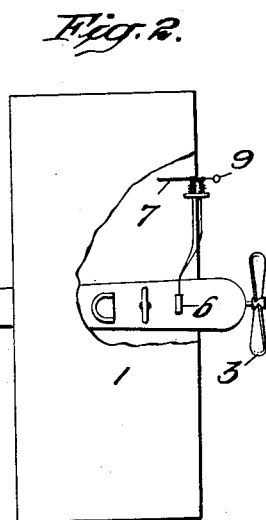
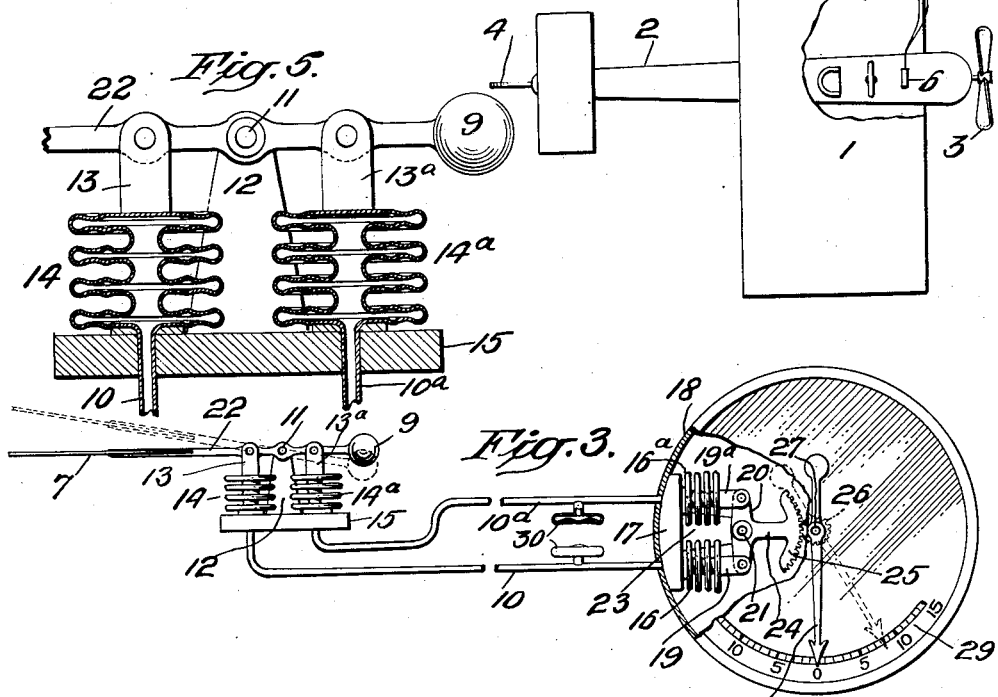
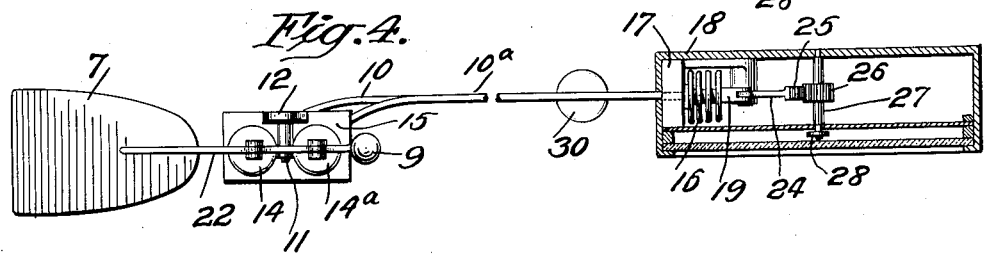
Inventor
Oscar A. Danielson,
By his Attorney Patented June 23, 1925.

1,543,061

UNITED STATES PATENT OFFICE.

OSCAR A. DANIELSON, OF BROOKLYN, NEW YORK.

BALANCED TRANSMISSION FOR DISTANT INDICATORS.

Application filed May 18, 1920. Serial No. 382,285.

*To all whom it may concern:*

Be it known that I, OSCAR A. DANIELSON, a citizen of the United States, and resident of the borough of Brooklyn, city of New York, in the county of Kings and State of New York, have invented certain new and useful Improvement in Balanced Transmissions for Distant Indicators, of which the following is a specification, reference being had therein to the accompanying drawing.

My present invention relates to novel and ingenious mechanism for transmitting motion or impulses from one point to another that is more or less distant from the first, and, if desired, operating an indicator or signal at the distant point, the latter terms covering broadly any means for conveying information.

The invention may obviously have a very wide application, but for purposes of explanation, I have chosen to select as a typical illustration of its adaptability, an example of its possible practical use in connection with aircraft. It will be understood therefore that while my system of transmission lends itself very readily to the specimens of mechanism herein shown and described, it may be used with equal value and effective results in a great variety of instruments of the same and other classes, both indicating and recording and of other kinds, where the movement to be indicated or recorded is at a moderate or substantial distance from the point where the indication or record is to be made; and is particularly useful where the distance point is not easily accessible.

In my former Letters Patent No. 1,332,810, dated March 2, 1920, for a "combined air speed meter and angle of incidence and side slip indicator with dial therefor," I have described and claimed a combination of several instruments, viz: an air speed meter, a side slip indicator, an angle of incidence indicator, and a dial having suitable signals to show what is transmitted thereto from the rest of the mechanism. In this patent a device consisting of a vane or vanes and which may be termed a transmitter, is mounted in any suitable manner between the two wings of an aeroplane, well out of and away from the influence of the propeller and the body of the machine, in order that said transmitter may be free from any disturbances of the air stream which these may cause. The function of this transmitter is to keep the aviator accurately informed at all times of the direction and speed of his machine through the air, but in order that it may be a reliable instrumentality for this purpose its location must necessarily be such as to give it the proper exposure, and such location as aeroplanes are now generally constructed will be out of the line of vision and too far distant from the operator to be easily seen; therefore an indicating dial or signal device is placed in a convenient spot on an instrument board directly in front of the aviator. It becomes necessary to provide means for transmitting the movement of the vanes or plates of the transmitter out in their exposed location on the wing strut, or elsewhere as the case may be, to the indicating dial on the instrument board in the cockpit. In my former Letters Patent, just referred to, two alternative systems of such transmission, are shown and described, one electrical and the other mechanical, the latter comprising essentially a set of movable wires connecting the transmitter with the indicator. In the novel system of transmission forming the subject of my present application for patent, I utilize a fluid, liquid, gas, gaseous, or similar means, properly conducted, carried, and controlled in a confined body or system, for effectuating an accurate and reliable transmission of motion.

For the purposes of illustration and a practical explanation of my present improvements I have selected only one of the instrumentalities described and shown in my former Letters Patent above alluded to, namely, the side slip or skid indicator. And I shall presently describe how my present invention qualifies for successful adaptation to such an indicator.

It should be borne in mind in following this explanation that a transmission means for aeroplane instruments should fulfill the following requirements:—

First, It should be as nearly frictionless as possible, because it is desirable to make the parts small and light, and when so made the forces acting upon them will therefore be correspondingly smaller.

Second, It should be unaffected by wide variations of temperature, such as may be encountered in tropical climates, or in arctic regions, or at extreme altitudes.

Third, It should be unaffected by changes in atmospheric pressure in passing from that at sea level to very high altitudes, where the pressure may drop to one-half or one-third atmosphere.

Fourth, It should be unaffected by gravitational forces.

Fifth, It should be unaffected by inertia when violent accelerations or decelerations of speed take place or when sudden changes of direction occur.

It will be found that my device constituting the present invention fulfills all of these requirements in a satisfactory and successful manner, as will be hereinafter fully described in the explanation of the mechanism taken as an example of the invention, and then more particularly pointed out in the ensuing clauses of claim.

In the accompanying drawing illustrating my invention:

Figure 1 is a side elevation of an aeroplane provided with my improved transmission mechanism applied for use in conjunction with the transmitter for the angle of side-slip, the vane of the latter being shown attached to the wing strut or post.

Figure 2 is a top plan view of the same, but brings out more fully the connections between the vane and the indicator on the instrument board.

Figure 3 is a conventional or diagrammatic view of my entire transmission system on an enlarged scale, certain parts being broken away and other parts sectioned, and with the indicator in plan.

Figure 4 is another view of the same mechanism, similar in character, and taken at right angles to the view in Figure 3.

Figure 5 is an enlarged detail sectional view of the flexible cells or diaphragms and their connections.

Similar characters of reference designate corresponding parts throughout all the different figures of the drawing.

Figures 1 and 2 are merely outline views of an aeroplane delineated in the simplest fashion for explanatory purposes merely, so as to indicate the location of the transmitter, which is similar to an ordinary weather vane, and the location also of the indicator in the cock-pit, quite a distance away from the vane, and thus demonstrate the need of a means of transmitting signals from one to the other. The aircraft shown is a biplane, having upper and lower planes 1, 1, carried by the main longitudinal frame or fuselage 2, at one end of which frame is a propeller 3, and at the other end a rudder 4, while between the aforesaid planes 1, 1 are the upright posts or struts 5, one of which has an arm 8, carrying the transmitting vane 7, whose movements correspond with the angle of slide-slip or skid. The indicator on the instrument board is denoted by 6. From the transmitter to the indicator runs a system or systems of tubes, diaphragms or bellows and accessories for handling and controlling one or more confined quantities of liquid, fluid, gas, or the like, in order to transmit the movements of the transmitter to the indicator, no matter how slight or delicate such movement may be, and these systems are balanced to insure accuracy of movement.

The vane 7 appears in edge view in Figure 3 and in side view in Figure 4, being in both views shown as deflected from its position with reference to the indicating dial, in order to exhibit to better advantage the connecting mechanism which it actuates. Vane 7 is carried by an arm 22, pivoted at 11 to a support 12 attached in any desired manner to the arm 8 projecting from interstrut 5. The arm 22 has a counterbalancing weight 9 on the end opposite vane 7. At equal distances on each side of the pivot 11 rods, blocks or lugs 13 and 13$^a$ are pivoted to the arm 22, and each of these members 13 and 13$^a$ is attached to and carried by a cell, diaphragm or bellows device 14 and 14$^a$. Each bellows device 14 and 14$^a$ is preferably a sylphon bellows, consisting of a series of one or more flexible diaphragms, there being in the present example eight diaphragms in each bellows. Each bellows 14 and 14$^a$ is a hollow closed flexible compartment, whose diaphragms are made of suitable, corrugated flexible plates, thus permitting the bellows to be expansible and contractible in the usual fashion. The lower ends of the bellows, 14 and 14$^a$ or the lowermost diaphragm in each bellows, are stationary, being attached to a piece 15, which is integral or closely combined with the part 12 that carries pivot 11; and the upper ends of the bellows 14 and 14$^a$ that are provided with blocks or lugs 13 and 13$^a$ pivoted to the arm 22 are movable as the diaphragms expand and contract under the action of the arm 22, moving with the vane 7.

Leading from the lower ends of the bellows 14 and 14$^a$ by being connected centrally with the lowermost diaphragm of each bellows, are tubes, pipes, conduits, or other passages 10, 10$^a$, which may be of copper or some other suitable substance. These tubes 10 and 10$^a$ lead from bellows 14 and 14$^a$ to similar sets of bellows 16 and 16$^a$, whose stationary ends are secured to a bracket 17, arranged in the casing 18 of the indicator, and whose movable ends are provided with lugs or blocks 19 and 19$^a$ pivoted to either end of an arm 20, which is pivoted at its middle point at 21 to a bracket 23 which is integral with or firmly secured to the bracket 17 in casing 18. A right-angled extension 24 of the arm 20 carries a gear segment 25 which is in mesh with a pinion 26 on the shaft 27 of the pointer 28, all as clearly shown in Figures 3 and 4. An enlarged view of the details of the bellows construction is portrayed very clearly in Figure 5; said pointer 28 being usually provided with a counterbalancing weight.

The bellows devices 14, 14ª and 16, 16ª, may be made in a variety of ways, and I do not desire to be confined to any particular construction. They will consist of flexible material that will allow expansion. They are in reality cells, or hollow expansion compartments, that is to say, enlarged terminals for the ends of the tubular connections 10 and 10ª. They are in effect a diaphragm arranged flexibly at each end of the tubular passages, or otherwise in connection therewith, and expand when acted upon so as to allow the liquid contents of the passages to adjust themselves as I shall presently set forth. I thus utilize two separate and independent closed systems, each containing a confined body of fluid, liquid, gas, gaseous material, or the like, in fact any substance that is fitted for the purpose; one system consisting of cell 14, tube 10 and cell 16; and the other system consisting of cell 14ª, tube 10ª and cell 16ª; the two systems having no communication with each other, but being arranged to operate on leverage devices at their ends so that the movement in the one may balance the movement in the other. Each system is filled with a liquid, preferably some light liquid, as alcohol or benzine, and then sealed up air-tight.

I will now explain how, with this arrangement of liquid-containing systems, every slight movement of the vane 7 will be communicated to the distant signal or dial, no matter how far off the latter may be.

Referring to Figure 3, suppose the air pressure moves vane 7 so that it will be shifted from the position shown in full lines to that shown in dotted lines in that figure. The result will be for the arm 22 to extend cell 14 and obviously to compress cell 14ª. Cell 14 will therefore have an enlarged capacity and will draw in liquid from tube 10, or tend to form a vacuum; while cell 14ª will have its capacity diminished by the same action of arm 22, thereby forcing a part of its liquid contents out into the tube 10ª. The only source from which cell 14 may receive more liquid to supply its increased capacity is from cell 16 by way of tube 10; and the only place to which the liquid expelled from cell 14ª can go is cell 16ª by way of tube 10ª. The effect therefore will be to compress cell 16 and extend cell 16ª in the same proportion as cells 14 and 14ª are respectively extended and compressed. Such an action must necessarily take place, because of the well-known law of liquids that they are but very slightly compressible, even under heavy pressures. The result of extending cell 16ª and compressing cell 16, as already stated, will be to rock arm 20 on pivot 21, and through segment 25 and pinion 26 move the pointer 28 over the scale 29 as shown.

The pointer 28 is preferably so set with relation to the vane 7 in this particular instrument that it will indicate zero when the vane lies parallel with the longitudinal axis of the aeroplane. When the pointer takes any other position, pointing to any of the figures of the scale 28, on one side or the other of the zero point, it indicates that the vane 7, which shows the direction of the air stream, has moved so as to occupy a position at an angle with the longitudinal axis of the aeroplane, and that there is skidding to the right or the left, but the aviator reads at all times on his instrument board the size of this angle of skid or side slip.

I have now described the operation of the means connecting by duplicate fluid-pressure columns the air-pressure operated unit and the indicator before the aviator's eye. I will next describe how a balance is created and secured to counteract the various outside disturbing forces.

In this explanation we keep in mind the changes of temperature to which the instrument is subjected. If we assume, for example that the bellows 14ª and 16ª are disconnected from their respective arms, or in other words, if we eliminate one of the duplicate systems of the transmission, leaving only the other which has the bellows 14 and 16 and tube 10 to do the work of transmitting the motion of the vane 7 to the pointer 28; and assume that the vane 7 is in its central or zero position as shown in Figure 3, at which time pointer 28 indicates zero; it will be evident that so long as the liquid in the system remains at a constant, even temperature the pointer 28 will remain on zero (there being no shifting of vane 7); but if the temperature changes, say it rises to a higher degree, the liquid will expand, and since the vane 7 remains at the zero point and no expansion of bellows 14 is possible, as no impulse is transmitted from the vane, and the vane holds the bellows 14 firmly against expansion, it follows that an expansion or an extension of the bellows 16 will take place, on account of the increased volume of the fluid, which will result in an eccentric or unauthorized movement of pointer 28 away from zero and thereby giving a false reading. A fall in temperature would of course produce a contrary action of the liquid and a false reading of the dial in an opposite direction. Obviously a transmission device of this kind, subject to irregular impulses, would be unreliable and of little use except when a constant temperature could be maintained, and therefore by the use of two systems which balance each other as I have explained, this serious defect in the use of a single line is cured.

Suppose we now assume that the bellows 14ª and 16ª are again fully connected up for practical use as shown in Figure 3, changes in temperature will affect both alike. If necessary to effect this more completely the tubes may be placed closely parallel with each other and both enclosed in a larger tube or surrounding envelope. Any expansion or contraction of the fluid in members 14, 10 and 16, will be balanced by a like expansion or contraction in the members 14ª, 10ª and 16ª, and since there will then be a balancing of opposing forces due to the fact that the bellows devices are connected to pivoted arms on opposite sides of the pivotal points, no movement will take place.

In cases where the transmission tubes 10 and 10ª are short, and expansion or contraction of the liquid due to temperature changes would be taken care of by a flexing of the diaphragms in the sylphon bellows without destroying the balance and equilibrium of the whole system. In cases where the tubes are so long that a change of volume of the liquid brought about by temperature changes cannot be taken care of in the bellows, I employ overflow or auxiliary cells or bellows 30, 30, which are less flexible than bellows 14, 14ª, and 16, 16ª, and do not yield except when an expansion of the liquid takes place which would subject the latter to an undesirable pressure. Likewise the additional bellows or diaphragm cells 30, 30 are of equal tension and do not in any case destroy the balance of the system. There may be any number of these auxiliary diaphragms situated at any point or points in the length of the tubes 10 and 10ª.

It will of course be understood that the pointer 28 and its mechanism is nearly or practically frictionless, and does not tend to retard the movement of arm 20 and thereby upset the balance of the liquid transmission system. It will appear from an inspection of Figure 3 that the entire system may be oriented to any position with relation to the earth without upsetting the balance of the system or disturbing the transmission of motion from vane 7 to the pointer 28, because the natural forces, both those due to gravity and those due to inertia, are equal in both lines of the transmission and acting at opposite ends of a lever arm they balance each other and the effect on the movement of the pointer is nil.

In the example of transmission mechanism shown herein and set forth in the foregoing description, I have illustrated and described the sylphon bellows in the transmitting end of the apparatus as of the same size as those in the receiving end of the same. Obviously the sylphon bellows at either end could be made either larger or smaller than those in the opposite end and the effect of such a difference in size would be to increase or to reduce the transmitted motion. This increase or reduction of motion varies inversely as the squares of the diameters of the respective bellows or cells. For example if the transmitting bellows are made twice the diameter of the receiving bellows the movement of the receiving bellows will be four times as great as that of the transmitting bellows. Therefore the bellows at the different ends of the apparatus may be variable in size and may be proportioned and changed with reference to each other in any desired manner for the purpose of accomplishing the special object in view.

I have hereinabove alluded to the breadth of application of the invention and to the great variety of instruments with which it might be adapted, mentioning indicators, recorders and the like. In those cases where it is desired to make the instrument a recording device instead of an indicating device, an amplification of movement due to having the bellows at the opposite ends of the system of variable size will be found of especial advantage, because it is possible in this way to secure an angular movement of the recording pen without the intervention of a gear segment and pinion. Recording instruments are obviously used for a great variety of puposes, familiar examples of which are those used by the United States Government Weather Bureau for recording changes in atmospheric pressure or temperature. Hence it is deemed unnecessary to describe in detail the construction and arrangement of recording pens or the mechanism for moving the paper on which the record is traced, and therefore I have omitted such illustration and description for the apparatus is familiar and well known and my present invention does not relate to any details therein but more specifically to the means for transmitting motion from one point to another where it is desired to indicate or record it or cause it to supply information for any object.

I desire to dwell again upon the breadth of the invention and to say that it does not matter what form of energy causes the motion which is transmitted nor what form of motion or action it may be translated or converted into at the receiving end of the transmission line, inasmuch as the invention is susceptible of a very wide and extensive modification in these respects. As I have already stated, while the invention is useful with aircraft of every type and manifold examples of aerial activity, and is productive of successful results with all kinds of indicating mechanism used with air propulsion or vehicular machinery of multiplied forms, yet it is obvious that it can be applied in a wide range of other devices, classes and lines of industry and business, and I therefore desire to impose no limitations on its use but reserve the right to adapt it to any purpose for which it may be found to be useful and efficient and in so doing to change and rearrange the precise mechanical details and features of construction within wide limits under the scope of the following claims.

Having thus described my invention, what I claim as new and desire to secure by Letters Patent is:—

1. In a transmitting mechanism, separate systems each comprising a passage and terminal cells filled with a confined body of fluid, a pivoted lever arm at each end of the systems for balancing same, to which arm the cells of the respective systems are pivotally connected at opposite sides of the lever pivot, a prime mover which acts on the lever arm at one end of the systems and means actuated by the lever arm at the other end of the systems.

2. In a transmitting mechanism, separate systems each comprising a passage and flexible hollow cells at each end of each passage filled with a confined body of fluid, means for balancing the systems consisting of leverage devices having pivots to which devices the flexible hollow cells of the respective systems are movably connected on each side of the lever pivots, means acting on said leverage devices to move the flexible hollow cells one the reverse of the other at one end of the systems, and means that the flexible cells and leverage devices operated at the other end of the systems.

3. In a transmitting mechanism, separate systems each comprising a passage and flexible hollow cells at each end of each passage filled with a confined body of fluid, in combination with means for balancing the systems consisting of a lever device to which the flexible hollow cells of the respective systems are movably connected, and overflow auxiliary flexible cells arranged in connection with the fluid passages to provide against undue expansion.

4. In a transmitting mechanism for indicating devices, duplicate systems of fluid transmission, each comprising a passage, a flexible diaphragm at each end of the passage and a confined body of fluid, a lever at each end of the systems to which said diaphragm are pivoted, a prime mover, and means to which the fluctuations of the prime mover are transmitted by the systems.

5. In a transmitting mechanism for indicating devices, the combination with a pressure-operated unit and a distant member, of duplicate balanced systems, each comprising a passage, terminal flexible members, and a confined body of fluid, lever arms at each end of the systems to which the flexible members are movably connected, one of said levers being actuated by the pressure-operated unit and the other actuating the distant member, together with auxiliary overflow flexible cells arranged in connection with the fluid passages to provide against undue expansion.

6. In a transmitting mechanism for indicating devices, the combination with a member exposed to the air currents and means to show the movements of said member, of a balanced transmission mechanism, consisting of duplicate closed systems, each comprising a passage, and an expansible diaphragm at each end thereof, each system containing a confined body of fluid, together with leverage devices arranged in connection with the diaphragms so that those at either end may function in opposite directions in balancing the action of the systems, together with auxiliary overflow flexible cells arranged in connection with the fluid passages to provide against undue expansion.

In testimony whereof I hereunto affix my signature.

OSCAR A. DANIELSON.